Dec. 13, 1938.   R. R. ERBE   2,139,812
AUTOMATIC PHONOGRAPH
Filed Dec. 3, 1936   6 Sheets-Sheet 1
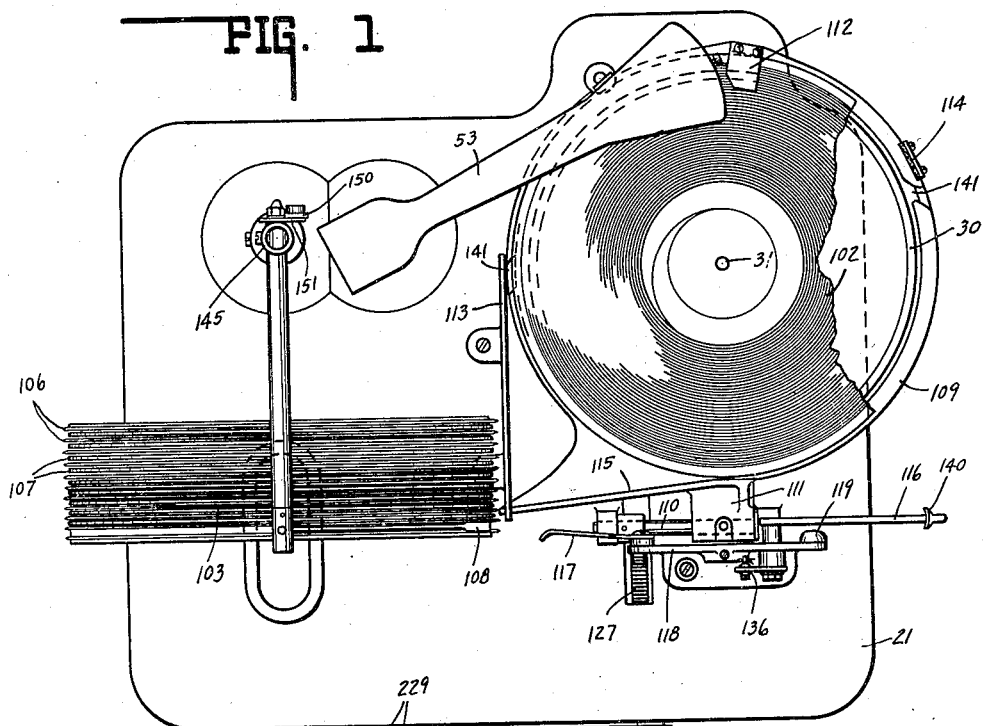
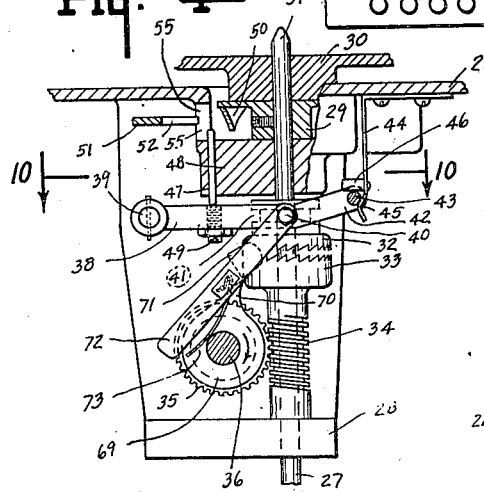
INVENTOR.
RALPH R. ERBE.
BY
Lockwood Goldsmith & Galt
ATTORNEYS.

Dec. 13, 1938.  R. R. ERBE  2,139,812
AUTOMATIC PHONOGRAPH
Filed Dec. 3, 1936    6 Sheets-Sheet 2
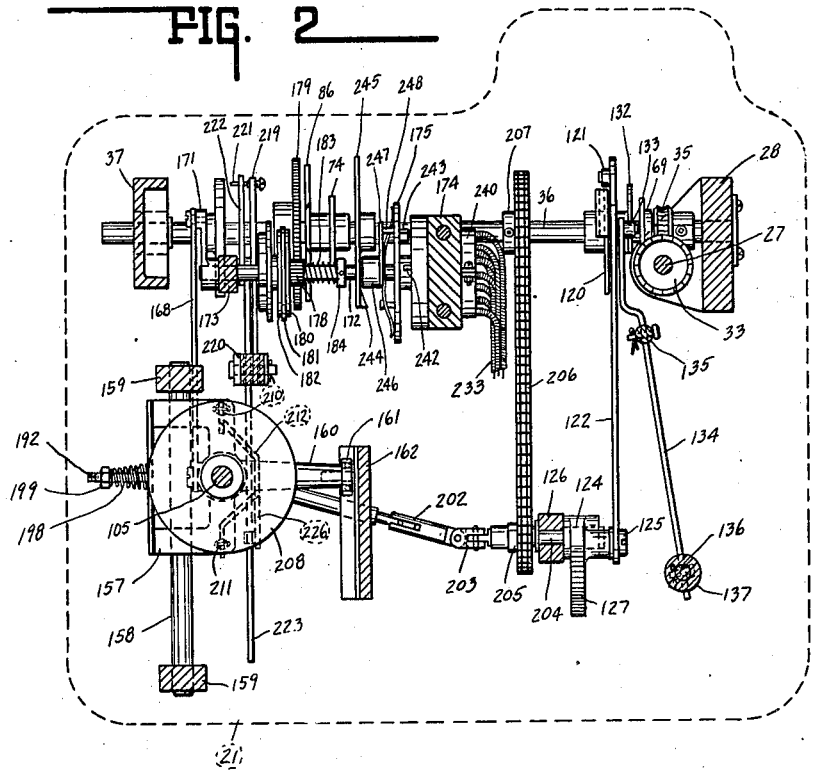
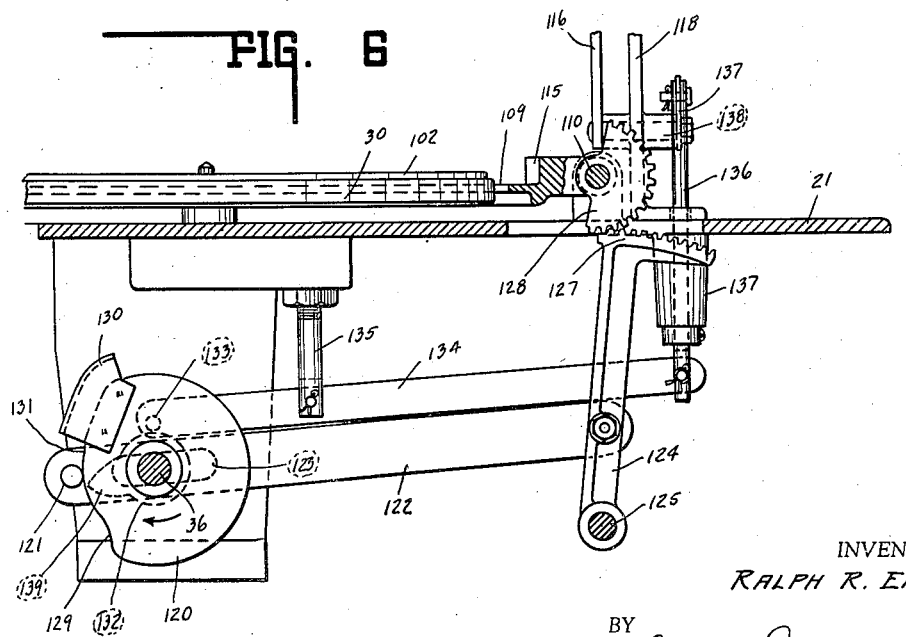
INVENTOR.
RALPH R. ERBE.
BY
Lockwood Goldsmith & Galt
ATTORNEYS.

Dec. 13, 1938.　　　　R. R. ERBE　　　　2,139,812
AUTOMATIC PHONOGRAPH
Filed Dec. 3, 1936　　　　6 Sheets-Sheet 3
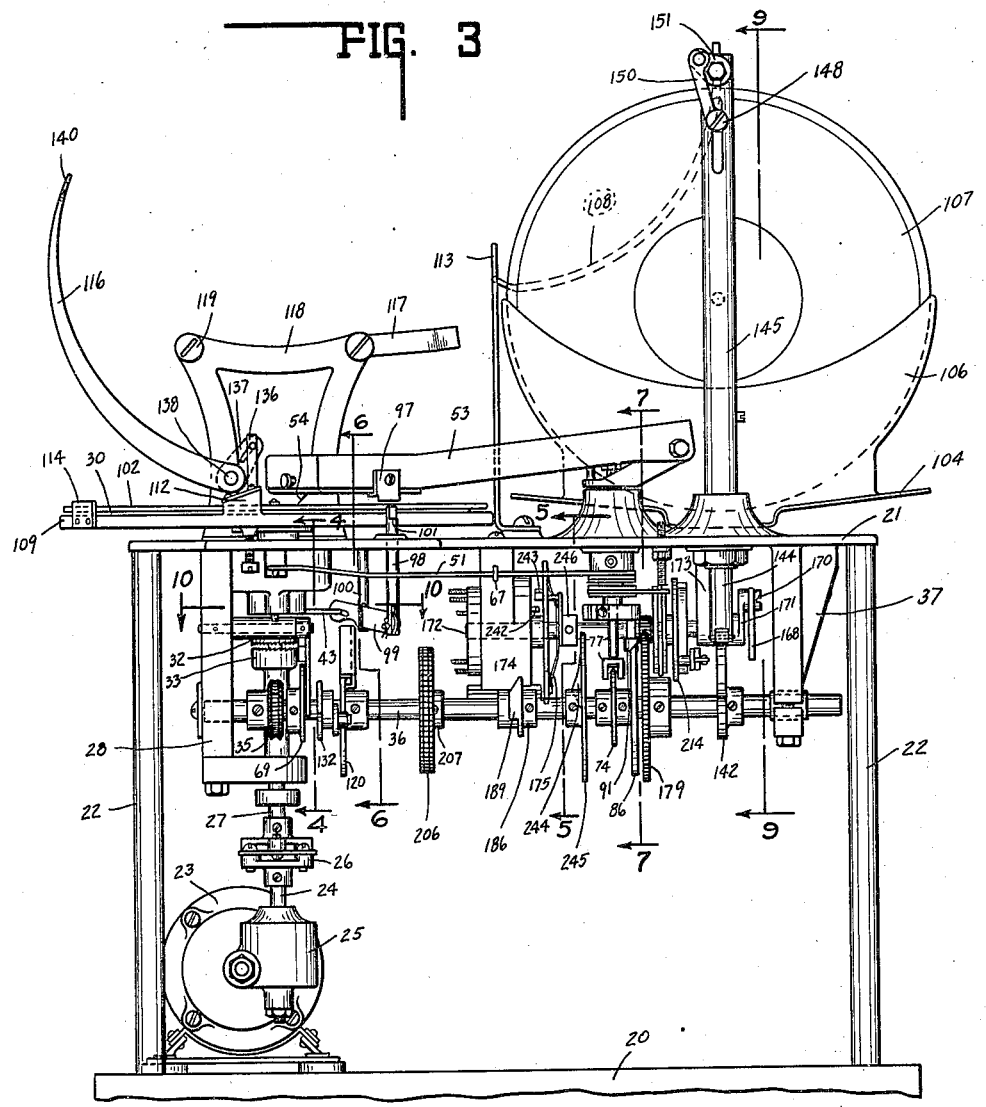
INVENTOR.
RALPH R. ERBE.
BY
Lockwood Goldsmith & Galt
ATTORNEYS.

Dec. 13, 1938.  R. R. ERBE  2,139,812
AUTOMATIC PHONOGRAPH
Filed Dec. 3, 1936  6 Sheets-Sheet 4
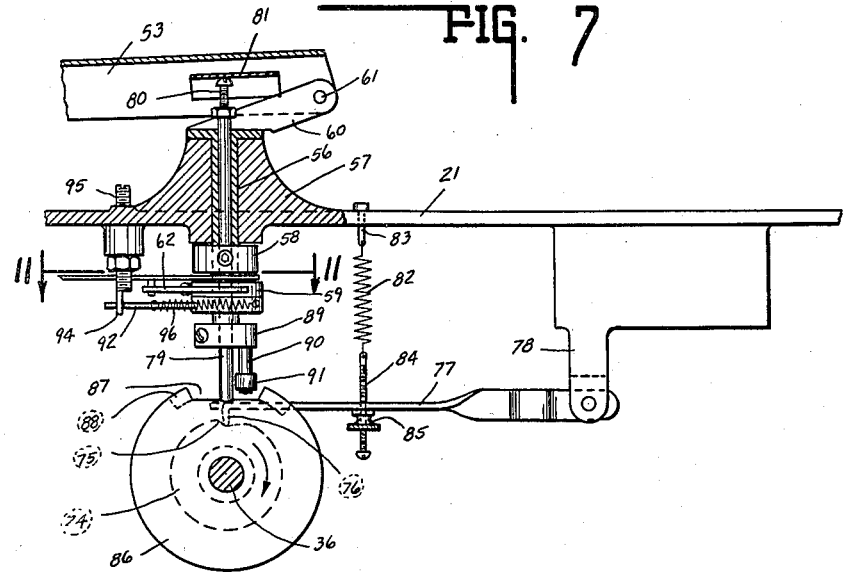
INVENTOR.
RALPH R. ERBE.
BY
Lockwood Goldsmith & Galt
ATTORNEYS.

Dec. 13, 1938.     R. R. ERBE     2,139,812
AUTOMATIC PHONOGRAPH
Filed Dec. 3, 1936     6 Sheets-Sheet 5
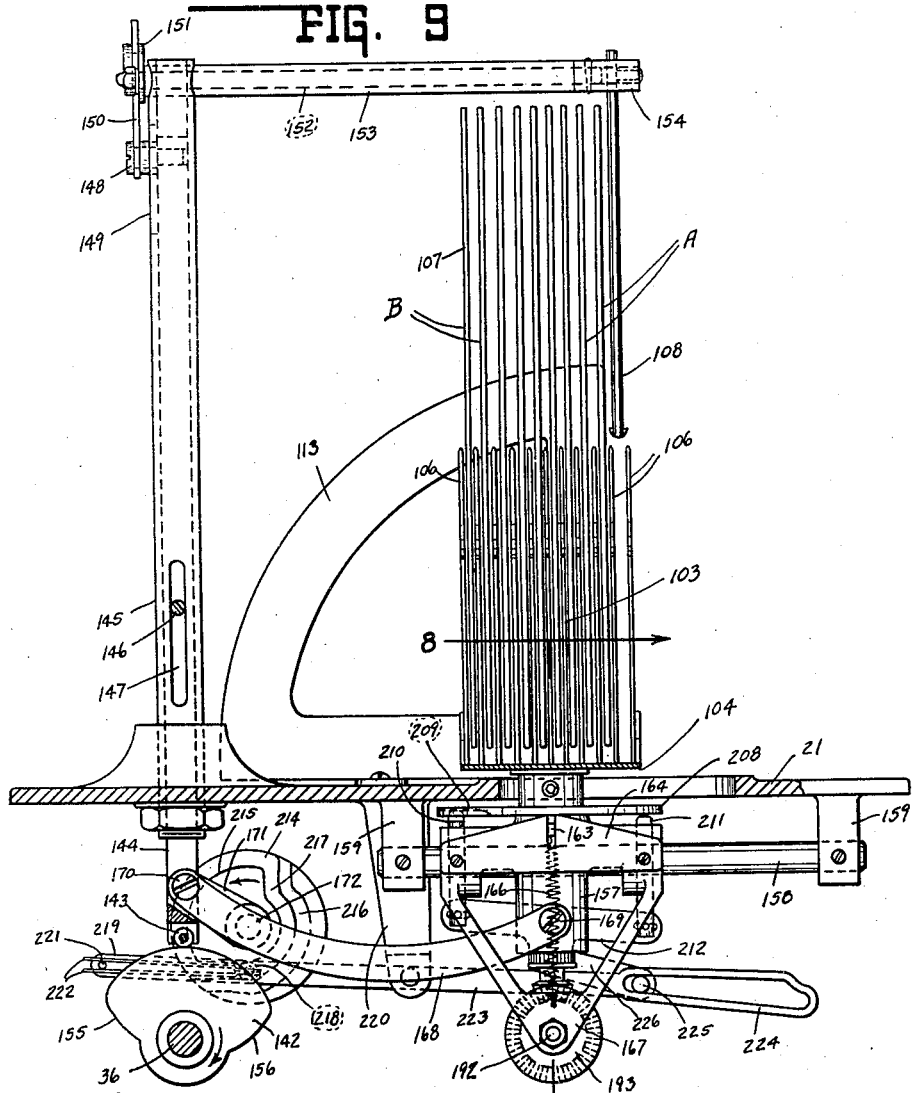
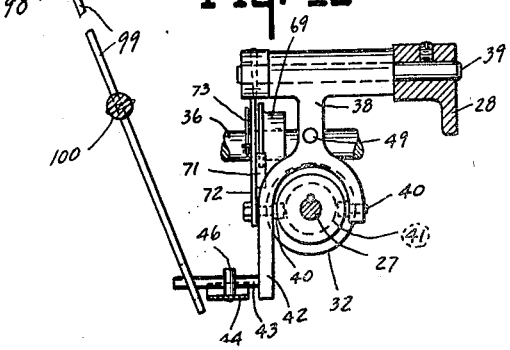
INVENTOR.
RALPH R. ERBE.
BY Lockwood Goldsmith & Galt
ATTORNEYS.

Dec. 13, 1938.   R. R. ERBE   2,139,812
AUTOMATIC PHONOGRAPH
Filed Dec. 3, 1936   6 Sheets-Sheet 6
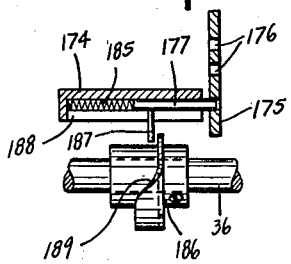
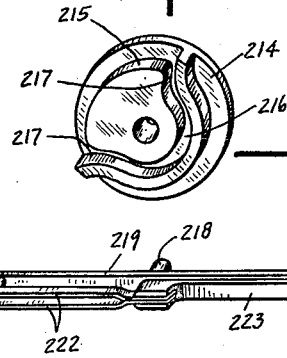
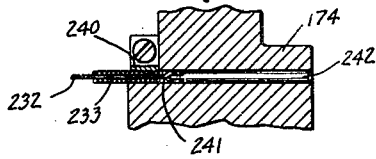
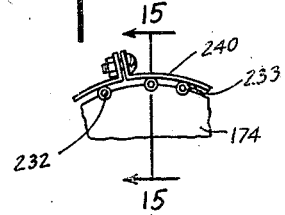
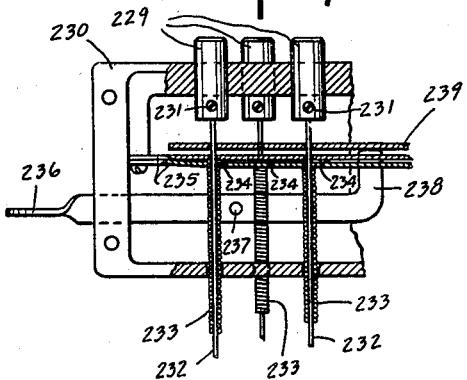
INVENTOR.
RALPH R. ERBE.
BY
*Lockwood Goldsmith & Galt*
ATTORNEYS.

Patented Dec. 13, 1938

2,139,812

UNITED STATES PATENT OFFICE 2,139,812

AUTOMATIC PHONOGRAPH

Ralph R. Erbe, Fort Wayne, Ind., assignor, by mesne assignments, to Reconstruction Finance Corporation, Chicago, Ill., a corporation Application December 3, 1936, Serial No. 113,995

11 Claims. (Cl. 274—10)

This invention relates to an automatic phonograph of the record-changing type and relates principally to the type in which a plurality of records are stored in a magazine and may be automatically removed therefrom for playing in a predetermined sequence or may be selectively removed at the will of the operator. Certain features of the invention, however, are applicable to other types of automatic phonographs.

One object of the invention is to improve and simplify the mechanism of phonographs of this type. To this end, the machine is provided with a magazine of simple and light construction in which the records are stored on edge, each in a separate compartment. Mechanism is provided for manipulating the magazine to present a predetermined record in position opposite a transfer member by means of which it is rolled from the magazine on a carrier which places it upon the usual turntable for playing. Mechanism is also provided for rotating the magazine to present opposite sides of the records.

Other objects and features of the invention will be understood from the accompanying drawings and the following description and claims:

Fig. 1 is a plan view showing that part of the mechanism located above a deck plate which serves as a fixed base for the support of the record-changing mechanism. Fig. 2 is a plan view with parts in section showing the mechanism located beneath the deck plate, the outline of the deck plate being indicated by broken lines 21. Fig. 3 is an elevational view of one side of the machine. Fig. 4 is a sectional view taken substantially on the line 4—4 of Fig. 3 with parts cut away to show other parts in detail. Fig. 5 is a fragmentary sectional view taken on the line 5—5 of Fig. 3. Fig. 6 is a fragmentary sectional view taken on the line 6—6 of Fig. 3. Fig. 7 is a sectional view taken on the line 7—7 of Fig. 3 with parts cut away to show other parts in detail. Fig. 8 is a sectional view in elevation taken on the line 8—8 of Fig. 9. Fig. 9 is a sectional view in elevation taken on the line 9—9 of Fig. 3. Fig. 10 is a fragmentary plan view in section taken on the line 10—10 of Fig. 3. Fig. 11 is a plan view with parts in section of a portion of the mechanism used for initiating the record-changing cycle. Fig. 12 is a fragmentary sectional view taken substantially on the line 12—12 of Fig. 5. Fig. 13 is a perspective view of a cam used for controlling the rotation of the magazine. Fig. 14 is a perspective view of certain levers associated with said cam. Fig. 15 is a fragmentary sectional view in elevation of a portion of the record selecting mechanism taken on the line 15—15 of Fig. 16. Fig. 16 is a rear view with parts cut away of a portion of an assembly of push buttons used for selecting records to be played. Figure 17 is a detailed fragmentary sectional view of the push button assembly.

In the form of the invention shown by way of illustration in the drawings, the stationary frame of the apparatus consists of a base plate 20 and a deck plate 21 supported thereon by corner posts 22, all of which may be contained in the usual ornamental cabinet, not shown in the drawings.

Driving mechanism

An electric motor 23 is mounted on the base plate 20 and drives a vertical shaft 24 through suitable gears contained in a housing 25 carried by the motor frame. The shaft 24 is connected by a flexible coupling 26 to a vertical shaft 27 which is journaled in a bracket 28 depending from the deck plate 21 and also in the said deck plate itself. At its upper end the shaft 27 carries a collar 29 secured thereto (Fig. 4) upon which rests the usual rotatable turntable 30. The upper end of the shaft 27 extends through the turntable to form a centering pin 31. Thus the motor 23, when actuated, continuously rotates the turntable 30.

The shaft 27 has splined thereto immediately beneath the deck plate 21 a clutch member 32 adapted to engage a mating clutch member 33 which is freely rotatable on the shaft 27 and which rests upon the bracket 28. The clutch member 33 has worm threads 34 formed thereon which engage the teeth of a worm gear 35 secured to a horizontal shaft 36. The shaft 36 is journaled at one end in the bracket 28 and at the opposite end in a bracket 37 depending from the deck plate 21. Said shaft carries a plurality of cams, each of which controls a certain portion of the record-changing mechanism. The shaft and cams are so arranged that a record-changing cycle is completed by one complete rotation of the shaft. This single rotation is initiated when the clutch member 32 is pressed downwardly to engage the clutch member 33 and is terminated when the clutch member 32 is again moved upwardly.

Clutch operating mechanism

The clutch 32 is operated to start the record-changing cycle at the completion of playing of each record. For this purpose a clutch yoke 38 (Figs. 4 and 11) is pivotally mounted on a pin 39 supported upon the bracket 28 and is provided with pins 40 engaging a groove 41 in the hub of the clutch member 32. The yoke 38 has an extending arm 42 carrying a pin 43 which engages a leaf spring 44 secured to the underside of the deck plate 21. The spring 44 is provided with a humped portion 45 which serves as a detent for the pin 43 and holds the same against accidental movement either in the upper or lower position. A pin 46 serves as a stop for the pin 43 to limit the upward movement thereof. A vertical pin 47 is slidably mounted in an embossment 48 formed on the deck plate 21 and engages at its lower end an adjusting screw 49 carried by the yoke 38. The collar 29 is provided with a downwardly extending point 50 which rotates through a path inside of the pin 47 in the rotation of the turntable. A flexible arm 51 having an inturned finger 52 is movable by movement of the pickup arm 53 and stylus 54 in the playing of the record on the turntable as will be described in more detail hereinafter. At the completion of the playing of a record, the finger 52 is moved inwardly through an aperture 55 in the embossment 48 into a position in the path of the point 50. In this position the finger 52 is located above the pin 47 and is struck by the point 50 on the next rotation of the turntable and is downwardly pressed against said pin. This downward pressure moves the yoke 38 about the pin 39 and presses the clutch member 32 downwardly against the resilient action of the spring 44. In this movement the pin 43 passes the hump 45 in said spring and is thereafter retained in the downward position, in which position the clutch members 32 and 33 are in engageemeent and the cam shaft 36 is rotated to perform the record-changing cycle.

The lever 51 is freely rotatable about a bushing 56 (Figs. 7 and 11) which in turn is pivotally mounted on a boss 57 formed on the deck plate 21. The arm 51 is held in place on said bushing by means of upper and lower collars 58 and 59 which are secured to said bushing. The upper end of the bushing 56 carries a yoke 60 to which the pickup arm 53 is pivotally attached by means of a pin 61. A pair of fingers 62 and 63 are pivotally mounted by means of pins 64 in suitable slots formed in the side of the collar 59 and are connected together by a tension spring 65. Said fingers engage a pin 66 carried by the arm 51. The arm 51 is supported midway of its length on a fixed support member 67 beneath the deck plate 21. The movement of the fingers 62 and 63 toward each other about their pivot pins 64 is limited by the conformation of the slots in which they operate so that they normally assume the position shown in Fig. 12. Their movement away from each other is not so limited and, therefore, the fingers may resiliently press the pin 66 to move the arm 51 through a limited distance in each direction. The outward movement of the arm 51 is limited by an upturned hook 68 on the support member 67 and the inward movement is limited by engagement of the finger 52 with the projection 50.

In the operation of the apparatus just described, the stylus 54 and the pickup arm 53 are moved inwardly by the grooves of the record during the playing thereof. In this movement, the bushing 56 is rotated, carrying with it the collar 59 and the finger 62. Just prior to the completion of playing of a record, the finger 62 strikes the pin 66 and when the stylus enters the steeply pitched terminal groove of the record, the finger 62 is rapidly moved to press the finger 52 into the path of the projection 50, thus operating the clutch 32 to start the record-changing cycle. At the first movement in the record-changing cycle, the pickup arm is swung outwardly to clear the record, as will be described in more detail hereinafter. In this movement, the finger 63 strikes pin 66 and withdraws the finger 52 from the path of the projection 50.

For disengaging the clutch at the end of the record-changing cycle, there is provided a cam 69 having a point 70 engageable with a block 71 secured to a link 72 (Fig. 4). The link 72 is secured at its upper end to one of the pins 40 and is resiliently supported by means of a wire spring 73 secured thereto and resting freely upon the shaft 36. In the position of the parts assumed during the playing of a record, as shown in Fig. 4, the block 71 is held clear of the point 70 by the spring 73. Thus the downward movement of the yoke 38, when the record-changing cycle is started, moves the block 71 against the rear face of the point 70 where it does not interfere with the start of rotation of shaft 36 in the direction of the arrow in Fig. 4 but is in position to be engaged by said point near the end of a complete rotation of said shaft. This engagement presses the block 71 and the link 72 upwardly and lifts the clutch member 32 out of engagement with the mating clutch member 33. The last portion of movement of the link 72 is due to the upward impulse of the spring hump 45 which thus draws the block 71 clear of the point 70 to permit the wire spring 73, which has been flexed by the pressure on the block 71, to move the block to the initial position of Fig. 4.

*Pickup arm manipulating mechanism*

The first operation in the record-changing cycle is the raising of the stylus from the record on the turntable and the swinging of the pickup arm to clear the record. To accomplish the raising of the pickup arm, there is provided on the shaft 36 a cam 74 (Figs. 3 and 7). The cam 74 has a substantially circular periphery provided with a single notch 75 which, during the playing of a record, engages a downwardly turned finger 76 on a lever 77. The lever 77 is pivotally mounted on a bracket 78 formed on the under surface of the deck plate 21 and has resting thereon adjacent the finger 76 a vertical pin 79. The pin 79 extends upwardly through the bushing 56 and is provided on its upper end with an adjusting screw 80 engaging a shelf 81 secured within the pickup arm 53. A tension spring 82 is secured to a pin 83 on the deck plate 21 and to a threaded adjusting pin 84 engaging a suitable threaded opening in the lever 77. A lock nut 85 threadedly engages the pin 84 and bears against the lower surface of the lever 77. Thus the spring 82 may be adjusted to compensate the weight of the pickup arm 53. At the commencement of the record-changing cycle the movement of the cam 74 raises the lever 77, the pin 79 and the pickup arm 53 to elevate the stylus from the record.

For swinging the pickup arm to one side to clear the record, there is provided on the cam shaft 36 a cam 86 having a recess 87 in its periphery provided with a beveled edge 88. A collar 89 is secured to the lower end of the bushing 56 and is provided with a downwardly extending, eccentrically located pin 90 carrying at its lower end a roller 91. In the position of the mechanism assumed during the playing of a record, as shown in Fig. 7, the roller 91 may move freely within the recess 87. At the completion of playing, the roller 91 has assumed the position shown in Fig. 3 in which it is in the plane of the cam 86 and within the recess 87. At the start of the record-changing cycle, soon after the stylus has been lifted from the record, the beveled edge 88 strikes the roller 91, pressing the same to the left in Fig. 3, and thus rapidly moving the pickup arm in the counterclockwise direction in Fig. 1 a sufficient distance to clear the record and permit removal thereof from the turntable. In the latter part of this movement, a finger 92, which is pivotally mounted by means of a pin 93 in a suitable slot on the collar 59, strikes a pin 94 which is eccentrically formed on the lower end of an adjusting stud 95 which is in turn threadedly secured in the deck plate 21. The arm 92 has secured thereto a tension spring 96 which is wrapped about the collar 59 and secured to said collar at its opposite end. In the latter part of the outward movement of the pickup arm, spring 96 is, therefore, extended and resists this movement.

Near the end of the record-changing cycle after a new record has been placed on the turntable, the cam 86 is rotated sufficiently for the recess 86 to again reach the roller 91. When this occurs, the pickup arm 53 is again free to move about its vertical axis and does so move in the clockwise direction of Fig. 1 under the influence of the spring 96. At the same time, the finger 76 enters the first part of the notch 75 and the pickup arm is gradually lowered. The initial return movement of the pickup arm is stopped when a plate 97 secured to the side thereof strikes the upper end of a pin 98 which is mounted for vertical sliding movement in the deck plate 21 (Fig. 3). The pin 98 is pivotally connected at its lower end to a lever 99 which in turn is pivotally mounted on a stem 100 secured to the under surface of deck plate 21. The lever 99 has a slotted connection at its opposite end with the pin 43. In the position assumed during the playing of the record, the pin 43 is upraised as shown in Fig. 4, and, therefore, maintains the pin 98 in the position shown in Fig. 3 with its upper end below the level of the plate 97. During the record-changing cycle, however, the pin 43 has been moved downwardly and the pin 98, therefore, is pressed upwardly sufficiently to intercept the plate 97 as the pickup arm is simultaneously swung inwardly and lowered, but not sufficiently to intercept said plate in the outward movement of the pickup arm. When plate 97 engages the pin 98, further lowering of the pickup arm brings said plate to rest on a shoulder 101 formed on the upper end of said pin with the stylus slightly above the new record on the turntable. In this position, the stylus is above the starting groove of the record and the pin 94 is so adjusted that finger 92 has reached the limit of its movement relative to the collar 59 and thus there is no further tendency for spring 96 to move the pickup arm. At the end of a complete rotation of shaft 36, the pin 43 is moved upwardly, as previously described, and the pin 98 is, therefore, moved downwardly, permitting the stylus to engage the new record 102 on the turntable.

*Record transfer mechanism*

The relative positions of the turntable 30 and magazine 103 are best seen in Fig. 1. The magazine consists of a base plate 104 mounted on the upper end of a vertical stem 105 and carrying a plurality of vertical plates 106 forming compartments for the reception of records 107 (Fig. 8).

The stem 105 may be moved in the direction parallel to the axes of the records 107 by mechanism hereinafter described, to preesnt any desired record opposite a transfer arm 108. The stem 105 may also be rotated about its vertical axis to turn the magazine to present the records with either face in position for playing.

For transferring records between the turntable and the magazine, there is provided a carriage 109 secured to a rock shaft 110 which is journaled in suitable bearings formed on the upper surface of the deck plate 21. The carriage 109 consists of a ring having a central opening sufficiently large to admit the turntable and having formed therewith an ear 111 for securing the same to the rock shaft 110. In the playing position of the mechanism, the carriage 109 assumes the position shown in Fig. 3 with its upper surface slightly below the level of the turntable. In the record-changing cycle after the pickup arm 53 has been moved to clear the record, the rock shaft 110 is rotated to raise the carriage into contact with the record 102 on the turntable and to lift the same into a vertical position opposite the compartment in the magazine from which the record was removed. In this movement, the record is retained on the carriage by means of a lug 112 having a projecting portion extending over the top of the record, by a stationary guide plate 113 secured to the deck plate 21, and by a second lug 114 formed on the carriage 109. In the vertical position of the carriage 109 the record rests upon the horizontal upper portion of an inclined trackway 115 formed as a part of said carriage and is then rolled downwardly along said trackway to its position in the magazine, a transfer arm 116 assisting in this movement. In this rolling movement, the record is guided between the carriage 109 and a resilient guide finger 117 secured to a bracket 118 mounted on the deck plate 21.

When the magazine has been manipulated to present a new record, the transfer arm 108 is moved to transfer the new record from the magazine up the inclined trackway 115 to a position in registry with the carriage 109. In this movement, the record is guided by the finger 117, by a guiding knob 119 formed on the bracket 118, by the lug 112 and by the carriage 109 itself. The rock shaft 110 is then moved to lower the carriage and record to place the new record on the turntable 30.

For raising and lowering the carriage 109 there is provided a cam 120 on the shaft 36 (Fig. 6). The outer surface of the cam is engaged by a roller 121 mounted on the end of a link 122 which is provided with a slotted opening 123 engaging the shaft 36. The link 122 is connected at its other end to a lever 124 which is pivotally mounted on a pin 125 secured to a bracket 126 formed on the under surface of the deck plate 21. The lever 124 carries at its upper end a gear segment 127 engaging a gear segment 128 through a suitable opening in the deck plate 21. The gear segment 128 is fixed to the shaft 110. The cam 120 is so shaped that the roller strikes an outwardly inclined portion 129 thereof at the proper time in the record-changing cycle to raise the carriage 109. The link 122 is thereby drawn to the left in Fig. 6 and thus rocks the shaft 110 to raise the carriage 109 and record 102 to the vertical position. At the proper time in the record-changing cycle for the lowering of the carriage with a new record, the roller 121 is engaged by a keeper 130 carried by the cam 120 and is moved thereby to the portion 131 of the cam having the least diameter. The keeper 130 engages the outer surface of the roller 121 and presses the lever 122 to the right in Fig. 6 to rock the shaft 110 and lower the carriage and new record to playing position.

To operate the transfer arm 116 to assist in the movement of the record from the carriage to the magazine, there is provided a cam 132 on the shaft 36 (Fig. 6). Said cam engages a roller 133 carried by a lever 134 which is pivotally mounted on a stud 135 secured on the under surface of the deck plate 21. The opposite end of the lever 134 is pivotally secured to a vertical stem 136 which is mounted for vertical sliding movement in a boss 137 formed on the deck plate 21. The upper end of the stem 136 has a pin and slot connection with an arm 137 (Fig. 3) which is secured to a rock pin 138 journaled on the bracket 118. The transfer arm 116 is secured to the opposite end of the rock pin 138. At the proper time in the record-changing cycle for the transfer of a record from the carriage to the magazine, a projection 139 on the cam 132 strikes the roller 133 and tilts the lever 134 to draw the stem 136 downwardly. This movement rocks the arm 116 in the clockwise direction of Fig. 3 about the axis of the pin 138. The forked upper end 140 of said arm engages the edge of the record and rolls the same promptly down the inclined trackway 115 to its place in the magazine. In this movement, the forked end 140 passes through suitable slots 141 in the edge of the carriage 109. As soon as the projection 139 has passed the roller 133, the arm 116 returns by gravity to the position shown in Fig. 3, in which position it does not interfere with future record movements.

For manipulating the transfer arm 108 to move records from the magazine to the carriage 109 there is provided on the cam shaft 36 a cam 142 (Fig. 9). Said cam is engaged by a roller 143 carried on the lower end of a vertical stem 144 which is slidably guided within a tubular guide member 145 secured to the deck plate 21. The stem 144 is prevented from rotating in said guide member by a pin 141 operating in a slotted opening 147 in the side of the guide member. At its upper end, the stem 144 is provided with a pin 148 operating in a slotted opening 149 in the guide member 145. The pin 148 has pivoted thereon a link 150 pivotally connected at its other end to an arm 151. The arm 151 is secured to a rock shaft 52 which is journaled in a horizontal tubular member 153 in turn secured to the tubular guide member 145. The transfer arm 108 is secured to the outer end of rock shaft 152 by means of a fitting 154.

Prior to the time in the record-changing cycle for the return of a record to the magazine, the roller 143 is engaged by an inwardly inclined portion 155 of the cam 142. The weight of the vertical stem 144 is sufficient to move the same downwardly, carrying with it the link 150 and rocking the shaft 152 and transfer arm 108 in the counterclockwise direction of Fig. 3 to place said arm at the right of the magazine in a position clear of the records in the magazine. Thereafter the record just played is returned to the magazine and the latter is manipulated to present a new record, whereupon the roller 143 is engaged by an outwardly inclined portion 156 of the cam 142 which serves to lift the stem 144 and to rock the transfer arm 108 to remove the new record from the magazine to the carriage 109. It will be noticed in Fig. 3 that the magazine plates 106 are provided with arcuate upper edges which insure clearance between said plates and the arm 108. Said arm, therefore, engages nothing but the record in moving the same to the carriage. During the playing of a record, the arm 108 remains in the position shown in Fig. 3.

*Magazine manipulating mechanism*

The vertical stem 105 on which the magazine 103 is mounted projects through a suitable opening in the deck plate 21 and is journaled in a carriage 157 which is slidably mounted on a horizontal rod 158 supported on brackets 159 on the under surface of said deck plate. Said carriage also has an extension 160 carrying a roller 161 which travels in a trackway 162 formed on the under surface of the deck plate 21 and serves to retain the carriage with the stem 105 in a vertical position. A pin 163 has one end loosely fitting a suitable opening in the carriage 157 and its outer end is flattened as best seen in Fig. 9 and engages a slot in a plate 164 secured to said carriage. Said pin carries a roller 165 engaging the upper surface of the rod 158 and has secured thereto a tension spring 166 secured at its upper end to a downwardly extending portion 167 of the carriage 157. Due to the tension of said spring the roller 165 carries a large part of the weight of the magazine and carriage 157 and thus reduces the frictional resistance to horizontal movement of the same.

The carriage 157 is reciprocated upon the rod 158 to place a desired record opposite the transfer arm 108 by means of a link 168 pivotally connected to said carriage by a pin 169. The opposite end of the link 168 is pivotally connected by a pin 170 with a crank 171 carried on the end of a rotatable shaft 172. The shaft 172 is journaled in a bracket 173 secured to the under surface of the deck plate 21 and in a selector housing 174 similarly secured. Said shaft also carries a disk 175 having adjacent the edge thereof a plurality of holes 176 adapted to engage a latch pin 177 which is slidably mounted in the selector housing 174 (Figs. 5 and 12). The holes 176 are properly spaced in the disk 175 so that each of the holes is engaged by the pin 177 when the magazine is in position with one of its records opposite the transfer arm 108. Since in the present case there is shown a magazine adapted to contain 10 records, there are shown 20 holes 176 due to the fact that the magazine passes each record position twice during each complete rotation of the shaft 172. The shaft 172 carries loosely thereon a pinion 178 meshing with a gear 179 secured to the cam shaft 36 (Fig. 2). The pinion 178 is formed integrally with a disk 180 which is adapted to cooperate frictionally with a friction disk 181 secured to a disk 182 in turn secured to the shaft 172. The pinion 178 is pressed by a compression spring 183 abutting thereagainst and against a collar 184 carried by the shaft 172. Said spring, therefore, maintains a frictional engagement between the disks 180 and 181. So long as the latch pin 177 engages one of the holes 176 the shaft 172 is held against rotation and slippage takes place between the disks 180 and 181.

The latch pin 177 is normally held in engagement with one of said holes by a compression spring 185 positioned within the selector housing 174 but is withdrawn by means of a cam 186 engaging a pin 187 secured to the latch pin 177 and operating in a slotted opening 188 in the housing 174. The cam 186 is carried by the cam shaft 36 and the operating portion 189 thereof strikes the pin 187 at the proper time in the record-changing cycle to begin the sliding movement of the magazine for selection of a new record. The operating portion of said cam is sufficiently long to retain the latch pin 177 in its retracted position long enough for the shaft 172 to make one complete revolution and a small fraction of another revolution. At the end of this time, the latch pin 177 is released and is free to enter the next of the holes 176 and thereby stop the rotation of shaft 172 and the movement of the magazine, if said movement has not already been stopped with another of said holes opposite the latch pin by selector mechanism to be hereinafter described. The purpose of providing more than a complete revolution of the shaft 172 for each withdrawal of the latch pin 177, is to insure that each of the holes 176 will pass the latch pin for possible selection of the corresponding record during each withdrawal and that the latch pin, in case no selection has been made, will not return to the hole from which it was withdrawn. Preferably, the latch pin is returned, in case of no selection, to the hole next to that from which it was withdrawn so that the records will be played in that case in the order of their arrangement in the magazine.

For rotating the spindle 105 and magazine 103 to present opposite sides of the records for playing, there is provided on the under end of said stem a beveled gear 190 (Fig. 8) meshing with a beveled gear 191 which is loosely mounted upon a stub shaft 192. The stub shaft 192 has splined thereto a disk 193 carrying a friction disk 194 adapted to engage the rear face of the beveled gear 191. A ball thrust bearing 195 is interposed between a shoulder 196 on the stub shaft and the inner face of the gear 191. A bushing 197 is slidably mounted on the shaft 192 and serves to journal said shaft in a downwardly extending portion 167 of the carriage 157. A compression spring 198 abuts against an adjusting nut 199 carried by the shaft 192 and against a washer 200 which bears upon the end of the bushing 197. By means of this construction, the spring 198 presses the gear 191 and friction disk 194 together, whereby the stem 105 and the magazine 103 will be rotated by rotation of the stub shaft 192 unless they are mechanically held against rotation. The stub shaft 192 is connected by means of a universal connection 201 to an extensible shaft 202, the opposite end of which is connected by a universal joint 203 to a stub shaft 204 which is journaled in the bracket 126 (Fig. 2). The stub shaft 204 carries a sprocket 205 which is driven by a sprocket chain 206 trained about a sprocket 207 on the cam shaft 36. Thus, the stub shaft 192 is continuously rotated throughout the entire record-changing cycle.

For mechancially holding the magazine against rotation, there is provided a disk 208 secured to the stem 105 and having a single slot 209 in the under surface thereof adapted to engage the upper ends of a pair of pins 210 and 211 which are mounted for vertical sliding movement in parts of the carriage 157 (Fig. 9). The pins 210 and 211 are pivotally connected to opposite ends of a lever 212 which is pivotally mounted on a pin 213 secured to the carriage 157. The length of the pins is such that when the lever 212 is rocked to move one upward for engagement with the disk 208 the other is moved downwardly out of contact therewith. Only one of said pins, therefore, may engage the slot 209 at any one time. Obviously, when the pin 210 engages said slot, the rotation of the magazine will be stopped with one face of the record in position for playing, while the opposite faces of the records will be in position for playing when the rotation is stopped by the pin 211. For convenience of reference the faces of the records which will be played when the magazine is stoppd by pin 210 are designated A in Fig. 9 and those played when the magazine is stopped by pin 211 are designated B.

For rocking the lever 212 to determine which face of the records shall be played, there is provided a cam 214 on the shaft 172, said cam being shown in perspective in Fig. 13. The cam is provided with an outer track 215 and an inner track 216 with intermediate portions 217 connecting the same. A roller 218 carried by a lever 219 engages said tracks. The lever 218 is pivotally mounted on a bracket 220, as best seen in Fig. 14, and carries at its outer end a pin 221 positioned between a pair of leaf springs 222 which are mounted on the end of a lever 223. The lever 223 is pivotally mounted on the bracket 220 concentrically with the lever 219 and extends beyond said bracket. At its outer end, the lever 223 is formed with a central opening 224 having diverging sides in which there is engaged a pin 225 carried by an arm 226 of the lever 212. By means of this construction, the pin 210 is raised and the pin 211 is withdrawn when the roller 218 rides on the inner track 216 of the cam, while the pin 211 is upraised and the pin 210 is withdrawn when the roller 218 engages the outer track 215. The leaf springs 222 provide sufficient resilience in the connection so that the pins may engage the under surface of the disk 208 while said disk is in rotation and will be pressed into the slot 209 by the action of said leaf springs when said slot moves into registry with the upraised pin. The divergent sides of the opening 224 insure uniform action between the roller 225 and the lever 223 for all horizontal positions of the magazine.

Referring to Fig. 5, it will be seen that the holes 176 are grouped on opposite sides of the disk 175, one group being designated A and the other B. There are provided spaces 227 and 228 between the groups, which spaces are greater than those between individual holes in each group and which pass latch pin 177 when the magazine is adjacent the limits of its reciprocating movement. The cam 214 is so placed on the shaft 172 that the intermediate portions 217 thereof are engaged by the roller 218 during the time the spaces 227 and 228 are passing the latch pin 177. Therefore, the roller 218 rides on the inner track 216 with pin 210 upraised during the time that the holes 176 of group A are passing the latch pin 177 and the magazine is moving in one direction and said roller rides on the outer track 215 with pin 211 upraised during the time group B is passing said latch pin and the magazine is moving in the opposite direction. Thus the stopping of shaft 172 with the latch pin 177 engaging one of the holes of group A results in playing the face A of the corresponding record while the engagement of latch pin 177 with the opposite hole of group B results in playing the face B of the same record.

Selecting mechanism

In order to permit the operator to select records to be played out of their predetermined sequence, there are provided a plurality of push buttons 229 equal in number to the number of selections available in the magazine counting both sides of each record. Each button may be suitably designated by a number or otherwise to indicate the selection corresponding thereto. The buttons are slidably mounted in a housing 230, a rear view of which is shown with parts cut away in Fig. 17. Each of the buttons 229 has adjustably secured thereto by means of a set screw 231 a wire 232 leading downwardly through a flexible tube 233 formed of coiled wire in a well known manner. Each of the tubes 233 has a projecting wire 234 on its upper end clamped between a pair of fixed plates 235, the wires 232 passing freely through suitable holes in said plates. A lever 236 pivotally mounted at 237 on the wall of the casing 230 projects outwardly through a suitable opening in said casing and has an upwardly turned portion 238 engaging a freely movable plate 239. The wires 232 pass through suitable holes in said plate and the same may be elevated by pressing the lever 236 to engage the lower ends of the buttons 229 to return the same to their upper position when it is desired to cancel a selection already made.

The tubes 233 and wire 232 lead to the selector housing 174 where the tubes 233 are clamped by a clamp ring 240 in suitable grooves in said casing (Figs. 15 and 16). Said grooves register with openings 241 extending through said casing and in which there are slidably mounted pins 242 attached at their inner ends to the wires 232. By this means, each pin 242 may be pushed to the right in Fig. 15 by a downward pressure on the corresponding push button 229. When so operated, the pins 242 extend into the path of travel of a projection 243 formed on the face of the disk 175. Said pins, therefore, serve to stop the rotation of the shaft 172 prior to the completion of its normal period of rotation. Each of said pins is so positioned that it stops said rotation with the latch pin 177 opposite the hole 176 corresponding to the record selected and in the group A or B corresponding to the face of the record selected. When said latch pin is released by the cam 186, it enters said hole and locks the record magazine in the proper position for removal of the selected record with the proper face of the record in position for playing.

When the magazine has been so locked by the latch pin 177, a projection 244 on a cam 245 carried by the shaft 36 engages a hub 246 which is slidably mounted on the shaft 172 and moves the same to the left in Fig. 3. The hub 246 has secured thereto a bar 247 (Fig. 5) carrying a pin 248 registering with an opening 249 in the disk 175. Said pin also registers with the pin 242 which has previously been used to stop the rotation of the shaft 172 and the movement of said hub returns said pin 242 to its position within the casing 174 and simultaneously returns the corresponding push button 229 to its normal upper position. A second pin 250, also carried by the bar 247, also passes through a suitable opening in the disk 175 and serves as a guide in the movement of the said bar. This pin, however, is not in registry with the pins 242 and, therefore, has no effect thereon. A leaf spring 251 interposed between the bar 247 and the disk 175 returns said bar to normal position as soon as the projection 244 has passed the same.

It will be apparent that several of the buttons 229 may be simultaneously pressed, projecting their corresponding pins 242 into the path of travel of the projection 243. The corresponding selections will be played in the sequence in which said projection strikes the pins.

Summary of operation

The movement of the stylus 54 into the steeply pitched terminal groove of the record at the end of the playing thereof moves lever 51 to place the finger 52 in the path of rotation of point 50. When said point strikes said finger, the clutch 32 is thrown into engagement with its mating element 33 by the mechanism shown in Fig. 4 to start rotation of cam shaft 36 and thereby initiate the record-changing cycle. At the same time pin 98 is raised by the downward movement of pin 43 (Fig. 3). The subsequent events in the cycle may be tabulated as follows, substantially in the order of their occurrence:

1. The stylus 54 is raised from the record by the action of cam 74 and stem 79 (Fig. 7).
2. The pickup arm is swung clear of the record by the action of cam 86 on roller 91 (Fig. 7). In this movement plate 97 passes over the top of pin 98.
3. The carriage 109 is raised to the vertical position, carrying the record with it, by the action of cam 120, link 134, lever 124 and gear segments 127 and 128 (Fig. 6).
4. The transfer arm 108 is withdrawn to the right side of the magazine by the action of cam 142, stem 144 and associated parts (Figs. 3 and 9). This event may take place simultaneously with any of the preceding three events or with events Nos. 9 and 10 below.
5. Transfer arm 116 is moved clockwise in Fig. 3 to roll the record into the magazine and is immediately returned to normal position, all by action of point 139 of cam 132, lever 134, stem 136 and associated parts (Fig. 6).
6. Latch pin 177 is withdrawn from the hole 176 in disk 175 by cam 186 (Figs. 5 and 12) to permit the friction connection 180—181 to rotate shaft 172 and consequently move the magazine by crank 171 and link 168 (Fig. 9). Assuming that the parts are initially in the positions shown in Figs. 5 and 9 and that a push button 229 has been pressed to select the face B of one of the records, a pin 242 will be in position to intercept projection 243 and stop the rotation of shaft 172 with the corresponding hole of group B opposite latch pin 177. In moving to this position, space 227 passes pin 177 and simultaneously roller 218 moves through the intermediate portion 217 of cam 214 and is engaged by the outer track 215 of said cam (Figs. 13 and 14) to withdraw pin 210 and raise pin 211 against the under side of disk 208. The withdrawal of pin 210 permits the friction connection 191—194 to rotate the magazine. The rotation is stopped at the end of a half revolution when slot 209 engages pin 211 and said pin is pressed into said slot by one of the leaf springs 222. Thus the magazine has been turned to present faces B for playing. Simultaneously with the rotation of the magazine, the horizontal movement thereof continues until stopped by the engagement of the projection 243 with the projecting pin 242 with the proper hole 176 of group B opposite the latch pin 177. Pin 177 is then released by cam 186, to enter said hole and lock the magazine in the proper position for removal of the selected record.

6a. Assuming that the parts are initially in the positions of Figs. 5 and 9 but the selection made is in group A, the horizontal and rotative movements of the magazine are started as before. However, the rotation of shaft 172 and movement of the magazine continue until the proper hole 176 of group A registers with the pin 177. In this movement, the roller 218 is returned to the inner track 216 of cam 214 when space 228 passes pin 177 and the pins 210 and 211 are again shifted to raise pin 210 and withdraw pin 211. The final stopping of the rotation of the magazine does not then take place until a complete revolution has been made, returning the faces A of the records to the playing position. Preferably the second shift of the pins 210 and 211 takes place before a half revolution of the magazine is completed so there will be no interruption in said rotation. In the example assumed, the pin 177 is initially in the last hole of group A. Obviously, if the start is made from one of the preceding holes in said group and a succeeding hole in the group is selected, there will be no rotation of the magazine, since the movement of shaft 172 will be stopped before the roller 218 moves from the inner track of the cam 214.

6b. Assuming again that a start is made from the position of Figs. 5 and 9 but no selection has been made, the horizontal and rotative movements of the magazine are initiated as before. None of the pins 242 are in position to stop the rotation of shaft 172. Soon after the hole 176 from which pin 177 was withdrawn passes said pin at the end of a complete revolution, said pin is released by the cam 186 and engages the face of disk 175. When said disk rotates far enough to bring the next hole 176 (in the assumed case the first hole in group B) opposite pin 177, said pin latches in said hole and stops shaft 172. In this rotation the pins 210 and 211 are shifted three times, once to start the rotation of the magazine by withdrawal of pin 210 when roller 218 moves to the outer track as space 227 first passes pin 177, again to withdraw pin 211 and raise pin 210 when roller 218 returns to the inner track as space 228 passes pin 177, and a third time to again withdraw pin 210 and raise pin 211 when roller 218 again moves to the outer track as space 227 again passes pin 177. The final stoppage of the magazine rotation then occurs with the B faces of the records in playing position. The speed of rotation of the magazine may be made sufficiently slow by suitable choice of its driving gears 190—191 so that all three shifts may be made before a half revolution is completed, in which case the final stoppage takes place at the end of a half revolution. This, however, results in unnecessarily slow operation in other cases, so it is preferable to provide a faster speed of rotation and thus permit the magazine to rotate through one and one-half revolutions before stopping in this particular case. The maximum of one and a half revolutions at the higher speed may be made in less time than the maximum of one revolution required when the slower speed is used. When the start is made from any but the last hole 176 in a group, only one complete revolution is made, the final stopping occurring at the next hole in the same group.

7. The pin 242 which was used to stop the magazine movement is returned to its place in casing 174 by the action of cam 245, bar 247 and pin 246 (Figs. 2 and 5), bar 247 being immediately returned by spring 251. This event may take place at any time during any of the succeeding events.

8. Arm 108 is rocked to move the newly selected record from the magazine to carriage 109, by the action of cam 142, stem 144 and associated parts (Figs. 3 and 9).

9. Carriage 109 is lowered to place the new record on the turntable 30, by the action of keeper 130 of cam 120, link 122, and gear segments 127 and 128 (Fig. 6).

10. The pickup arm 53 is released for inward movement by the arrival of the recess 87 of cam 86 opposite roller 91 and said pickup arm moves inwardly under the influence of spring 96 (Figs. 7 and 11). At the same time the pickup arm is lowered by the action of cam 74 a sufficient distance for plate 97 to strike pin 98 and stop the inward movement of the pickup arm with the stylus above the initial groove of the record. Further lowering of the pickup arm by cam 74 brings plate 97 to rest on the shoulder 101 of pin 98 with the stylus still slightly above the record.

11. The rotation of the cam shaft 36 is stopped by the action of point 70 of cam 69 engaging block 71 to press clutch element 32 upwardly out of engagement with its mating member 33 (Fig. 4). At the same time the upward movement of pin 43 lowers pin 98 out of engagement with plate 97 and thus places the stylus on the record to commence the playing thereof.

The operation of the motor 23 may be electrically controlled by any well known method either by manual switches or coin controlled switches, many suitable arrangements being commercially well known.

The foregoing specification describes the invention in its present preferred form. Changes in the details thereof may be made by those skilled in the art without departing from the scope of the invention as defined by the appended claims.

The invention claimed is:

1. In an automatic record changing phonograph, the combination with a turntable and a reproducer, of a magazine adapted to hold a plurality of records in vertical parallel relation, a reciprocable carriage for supporting said magazine to one side of the turntable, means for mounting said magazine upon said carriage for rotative movement so as to reverse the records carried thereby, means for simultaneously reciprocating said carriage and rotating said magazine thereon, selective means for controlling the reciprocal movement of said carriage and rotation of said magazine to face the selected side of a selected record in a predetermined position for transfer to said turntable, and means actuated upon the selective positioning of the magazine relative thereto for transferring the selected record thereto with the selected side in playing position.

2. In an automatic record changing phonograph, the combination with a turntable and reproducer, of a magazine adapted to hold a plurality of records in vertical parallel relation, means for supporting said magazine to one side of the turntable for reciprocable and rotary movement relative thereto, means for transferring a record from the magazine to the turntable and returning it from the turntable to the magazine, means for automatically moving said magazine to progressively present said records to said transfer means for transfer to the turntable in sequence, automatic means for rotating said magazine to reverse the records and present opposite sides thereof to said transfer means and manually actuated selective means movable into the path of movement of the magazine effective to arrest the movement thereof and render ineffective the automatic progressive positioning thereof in sequence, to present the selected side of a selected record for transfer to said turntable.

3. In an automatic record changing phonograph, the combination with a turntable and a reproducer, of a magazine adapted to hold a plurality of records in vertical parallel relation, means for mounting said magazine for reciprocable and rotative movement relative to said turntable, means for registering a plurality of selections for the respective records and either side thereof prior to playing, mechanism operatively connected with said magazine and controlled by said registering means for automatically reciprocating and rotating said magazine to a selected position relative to said turntable to present the selected side of a selected record for transfer thereto in sequence, and means actuated upon the positioning of said magazine for sequentially transferring the respective preselected records to the turntable with the respective selected sides thereof in playing position.

4. In an automatic record changing phonograph, the combination with a turntable and a reproducer, of a magazine adapted to hold a plurality of records in vertical parallel relation, a reciprocating carriage for rotatably supporting said magazine, means for reciprocating said magazine, a plurality of selecting means for arresting the movement of said magazine in predetermined positions respectively for positioning selected records for transfer to said turntable, manually actuated means for registering a plurality of said selecting means in advance of arresting said magazine, means operatively connected with said magazine and selecting means for reversing the position of said magazine to present opposite sides of said records for transfer to playing position on said turntable, and means actuated upon positioning of said magazine for transferring said record to the turntable with the selected side in playing position.

5. In an automatic record changing phonograph, the combination with a turntable and a reproducer, of a magazine adapted to hold a plurality of records in vertical parallel relation, means for supporting said magazine for reciprocating and rotating movement relative to said turntable, a selecting member identified with each side of each of said records, means for actuating said selecting members for registering a plurality of selections for the respective records and either side thereof prior to playing, mechanism operatively connected with said magazine controlled by said selecting members when actuated for automatically positioning said magazine relative to said turntable to present the selected side of a selected record for transfer thereto, and means actuated upon the positioning of said magazine for transferring the respective preselected records to the turntable with the respective selected sides thereof in playing position.

6. In an automatic record changing phonograph, the combination with a turntable and a reproducer, of a magazine adapted to hold a plurality of records in vertical parallel relation, a reciprocating carriage for rotatably supporting said magazine, means for reciprocating said carriage, means operatively connected with said magazine for reversing said magazine thereon, a plurality of record selecting members movable in position to arrest the movement of said carriage at predetermined positions respectively relative to said turntable for positioning selected records for transfer to said turntable and controlling said reversing means for presenting a selected side of said selected record for transfer to playing position, and means actuated upon the selected positioning of said magazine for transferring said record to the turntable with the selected side in playing position.

7. In an automatic record changing phonograph, the combination with a turntable and a reproducer, of a magazine slidably and rotatably mounted to one side of said turntable adapted to hold a plurality of records in vertical parallel relation, a plurality of record selecting members one for each side of each record, means for actuating said members for registering a plurality of selections for the respective records and either side thereof prior to playing, mechanism for reciprocating and rotating said magazine to different positions relative to said turntable, means controlled by each of said members when actuated for arresting said magazine in a predetermined selected position, to present a selected side of a selected record for playing, and means for transferring said selected record to the turntable with its selected side in playing position.

8. In an automatic record changing phonograph, the combination with a turntable and a reproducer, of a magazine adapted to hold a plurality of records in vertical parallel relation, a slidably mounted carriage for supporting said magazine relative to said turntable for positioning a selected record for transfer thereto, an actuated member connected with said carriage and movable for reciprocating the same, a plurality of stop members selectively actuated to project into the path of said actuated member for arresting its movement to selectively position the magazine, means for driving said actuated member, means operatively connected with said magazine and controlled by said actuated member when arrested by said stop members in certain positions for rotating said magazine a half revolution to reverse the records carried thereby to position the selected side of a selected record relative to said turntable for transfer thereto in playing position, and means for transferring a record from the magazine to the turntable and returning it to the magazine after playing.

9. In an automatic record changing phonograph, the combination with a turntable and a reproducer, of a magazine adapted to hold a plurality of records in vertical parallel relation, manually actuated members for selecting a record and the side thereof to be played, means for automatically reciprocating and rotating the magazine relative to the turntable for positioning a selected record for transfer thereto, means operated by said members for arresting the magazine in its reciprocatory and rotary movement in a position to present the selected record with the selected side thereof facing in a predetermined position relative to the turntable, and means for transferring said record to the turntable.

10. In an automatic record changing phonograph, the combination with a turntable, a transfer member and a reproducer, of a magazine adapted to hold a plurality of records in vertical parallel relation, means for supporting said magazine to one side of the turntable for reciprocable and rotary movement, record selective means, mechanism controlled by said selective means for reciprocating and rotating the magazine relative to said transfer member to face the selected side of a selected record in predetermined position for transfer, and means for actuating said transfer means upon positioning of said magazine for transferring the record to the turntable with the selected side in playing position.

11. In an automatic record changing phonograph, the combination with a turntable, a transfer member and reproducer, of a magazine adapted to hold a plurality of records in vertical parallel relation, means for supporting said magazine for reciprocable and rotary movement, a drive member, means driven by said member for reciprocating said magazine, means driven by said member for rotating said magazine, a plurality of record selective members, means actuated thereby for arresting the movement of the drive member at a selected position for causing said magazine to be selectively positioned to present a selected record with the selected side thereof faced in a predetermined direction relative to said transfer member, and means for actuating said transfer member upon the positioning of said magazine for transferring the said record to the turntable with the selected side in playing position.

RALPH R. ERBE.